(12) United States Patent
Siler et al.

(10) Patent No.: US 6,354,096 B1
(45) Date of Patent: Mar. 12, 2002

(54) VEHICULAR COOLING SYSTEM

(76) Inventors: Nicholas R. Siler; Frank Nelson Jarrett, both of c/o Modine Manufacturing Company, 1500 DeKoven Ave., Racine, WI (US) 53403-2552

( * ) Notice: Subject to any disclaimer, the term of this patent is extended or adjusted under 35 U.S.C. 154(b) by 0 days.

(21) Appl. No.: 09/693,046

(22) Filed: Oct. 20, 2000

(51) Int. Cl.[7] ............................................... F25B 39/04
(52) U.S. Cl. ...................................... 62/183; 236/35.3
(58) Field of Search ........................... 62/183; 236/35.2, 236/35.3

(56) References Cited

U.S. PATENT DOCUMENTS

| | | | |
|---|---|---|---|
| 2,353,610 A | * 7/1944 | Chisolm, Jr. ............... | 236/35.2 |
| 3,004,402 A | * 10/1961 | Dart et al. ..................... | 62/183 |
| 3,265,300 A | * 8/1966 | Selway ....................... | 236/35.2 |
| 3,392,541 A | * 7/1968 | Nussbaum ................... | 62/183 |
| 3,584,466 A | * 6/1971 | Kaufman et al. ............. | 62/183 |
| 3,759,056 A | * 9/1973 | Graber ....................... | 236/35.2 |
| 3,769,810 A | * 11/1973 | Swartwout ................... | 62/183 |
| 6,164,909 A | * 12/2000 | Ehlers et al. ............ | 415/208.1 |

FOREIGN PATENT DOCUMENTS

DE 19724728 A1 2/1999

* cited by examiner

Primary Examiner—William E. Tapolcai
(74) Attorney, Agent, or Firm—Wood, Phillips, VanSanten, Clark & Mortimer

(57) ABSTRACT

Fan horsepower requirements and the size of power train heat exchangers may be reduced in a vehicular cooling system that includes an inlet (14) for the receipt of ambient air and first and second heat exchangers (28), (40) in proximity to the inlet (14) to receive ambient air therefrom and which are respectively adapted to receive first and second heat exchanger fluids by the ambient air. The first and second heat exchangers (28), (40) are in side by side, substantially non superimposed relation to define first and second air flow paths (52, 54) extending in fluid flow parallel to a respective one of the heat exchangers (28), (40) from the inlet (14) to points (50), (52), (54) of discharge. A fan (44) flows air from the inlet (14) through the flow paths (52, 54) and a shutter (56) is located in one of the flow paths (54) and is movable between first and second positions respectively restricting air flow and allowing relatively unrestricted air flow. An actuator (88) provided for moving the shutter (56) between the positions and a control (90, 98, 100) is provided for the actuator (88) which is responsive to power train and air conditioning system operating conditions.

5 Claims, 5 Drawing Sheets

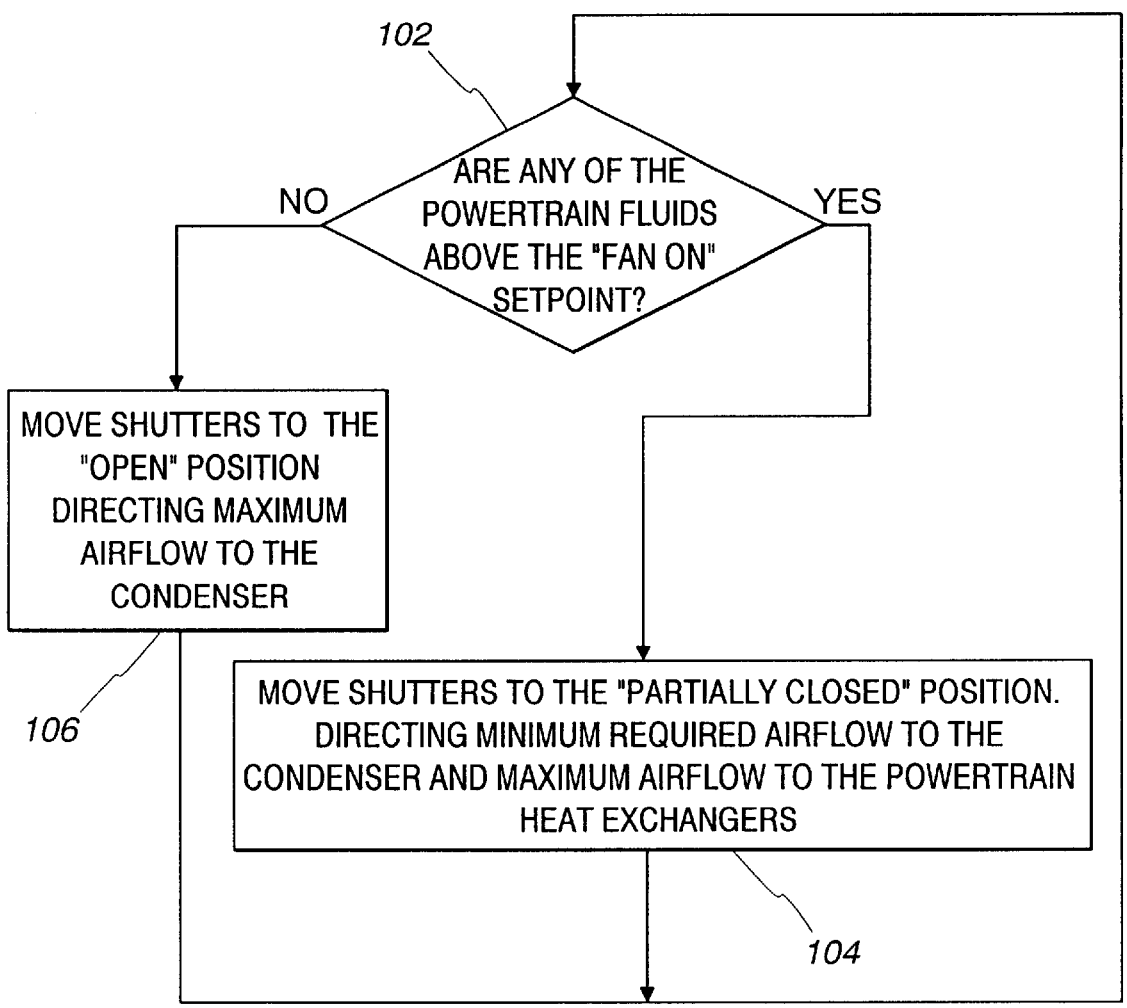

VEHICULAR COOLING SYSTEM

FIELD OF THE INVENTION

This invention relates to cooling systems for vehicles, and more particularly, to a vehicular cooling system that reduces fuel consumption and which provides more traction power.

BACKGROUND OF THE INVENTION

Vehicular cooling systems are becoming increasingly complex. While the cooling systems on early internal combustion engine powered vehicles were as simple as the provision of fins on the exterior of the cylinders of the engine to provide air cooling of the engine, they have evolved significantly. In today's world, the use of liquid cooled engines requires the vehicle to have a radiator to cool the liquid engine coolant. Moreover, where the engine is turbocharged, it is desirable to cool the compressed air exiting the turbocharger to increase its density and increase engine efficiency. This necessitates a so-called intercooler or charge air cooler.

Frequently, too, engine and/or transmission fluids such as lubricating or hydraulic oil, or both, require cooling to prevent damage to the components with which they contact.

These components may be referred to as power train heat exchangers inasmuch as the heat rejection required of them is almost entirely dependent upon engine loading. The higher the engine load, the more heat that must be rejected.

At the same time, modern vehicles typically are equipped with air conditioning systems operating on the vapor compression system. As a consequence, it is necessary that the air conditioning system include a condenser or gas cooler (the terms are used interchangeably herein) for cooling refrigerant by rejecting heat to the ambient air. While refrigerant heat rejection is related to the ambient temperature and to the control setting of the air conditioning system, typically located within a passenger compartment, power train heat rejection is related to the fuel combustion rate of the engine. Higher fuel consumption requires higher engine coolant, charge air, and transmission or engine oil heat rejection. And ambient temperature does not significantly increase the heat rejection required of the power train. Rather, it simply decreases the temperature difference between the power train fluids and the ambient.

Thus, because power train and air conditioning system heat rejection rates are basically independent of one another, the application of conventional wisdom has resulted in only a very minimum integration of the respective systems, where there has been any integration of them at all. As a result, the total vehicle cooling system, which is the sum of both power train cooling systems and air conditioning systems has resulted in overly large heat exchangers to assure maximum heat rejection when required as well as a relatively high fan horsepower requirement to assure that the maximum rate of cooling air can be flowed through all of the heat exchangers involved. This not only adds to the expense of the system, it adds to the cost of operating it because of excessive fan horsepower requirements.

The present invention is directed to overcoming these difficulties.

SUMMARY OF THE INVENTION

It is the principal objection of the invention to provide a new and improved vehicular cooling system. More specifically, it is an object of the invention to provide such a cooling system wherein fan horsepower requirements are minimized and which allows the use of smaller heat exchangers than would be required for a conventional cooling system for a similar vehicle.

According to the preferred embodiment of the invention, there is provided a vehicular cooling system which includes an inlet for the receipt of ambient air. First and second heat exchangers are located in proximity to the inlet to receive ambient air therefrom and are respectively adapted to receive first and second heat exchange fluids to be cooled by the ambient air. The first and second heat exchangers are in side by side, substantially non-superimposed relation to define first and second air flow paths, respectively, extending in fluid flow parallel through a respective one of the heat exchangers from the inlet to one or more points of discharge. One or more fans are provided for flowing air from the inlet through the first and second flow paths. A shutter is located in one of the flow paths and is movable between a first position relatively restricting air flow through the one flow path and a second position allowing relatively unrestricted air flow through the one flow path and additional positions intermediate the first and second positions. An actuator is provided for moving the shutter between the positions.

In a highly preferred embodiment, a control is provided for the actuator.

In a preferred embodiment of the invention, the second heat exchanger is a gas cooler for an air conditioning system and the shutter is in the second flow path.

Preferably the shutter comprises first and second, relatively movable grates.

In one embodiment, one of the grates is fixed with respect to the second heat exchanger and the other of the grates is movably mounted with respect to the second heat exchanger. The actuator is connected to the movably mounted grate.

In one embodiment, the control includes a fan drive controller for the fan(s) and is operative to a) control the speed of the fan(s) and b) provide a position control signal for the actuator.

The invention contemplates that the first heat exchanger is a radiator for cooling engine coolant and the second heat exchanger is a gas cooler for an air conditioning system. The control includes a fan controller providing a "fan on" set point, a transducer for monitoring the temperature of the first fluid, and a comparator for comparing the monitored temperature with the set point and causing the actuator to a) move the shutter toward the first position when the monitored temperature exceeds the set point and b) move the shutter toward the second position when the monitored temperature does not exceed the set point.

The invention contemplates that the first and second heat exchangers be arranged as adjacent sides of a polygonal solid.

In a highly preferred embodiment, there are two of the first heat exchangers and the second heat exchanger has one side adjacent one of the first heat exchangers and an opposite side adjacent the other of the first heat exchangers. A third heat exchanger is located oppositely of the second heat exchanger and has a first side adjacent one of the first heat exchangers and an opposite side adjacent the other of the first heat exchangers. The fan(s) is surrounded by the heat exchangers.

According to the embodiment of the preceding paragraph, the heat exchangers are arranged as respective sides of a polygonal solid having a trapezoidal cross section.

In one embodiment of the invention, the shutter includes a fixed element and a movable element mounted for movement relative to the fixed element. A first link is connected to the fixed element by a first pivot and is connected to the actuator. A second link is connected to the movable element by a second pivot and to the first link by a third pivot spaced from the first pivot.

Other objects and advantages will become apparent from the following specification taken in connection with the accompanying drawings.

DESCRIPTION OF THE DRAWINGS

FIG. 7 is a flow diagram of a computerized routine used by the system control.

DESCRIPTION OF THE PREFERRED EMBODIMENTS

While the invention herein will be described in the context of a cooling system module employing a radial fan such as is disclosed in the commonly assigned, copending application of Ehlers et al., Ser. No. 09/194,993 filed Dec. 3, 1998, now U.S. Letters Pat. No. 6,164,909 granted Dec. 26, 2000, the entire disclosure of which is herein incorporated by reference, it is to be understood that the same is not limited to use in the module therein disclosed. Specifically, Ehlers et al. discloses a so-called "compact cooling system" wherein heat exchangers are arranged radially outward of a radial fan to form a polygonal solid. However, the invention is also useful with other modules wherein, for example, a plurality of heat exchangers are arranged in side by side relation in substantially a common plane with power train heat exchangers being located to one side of a gas cooler for an air conditioning system.

It is also to be observed that while the invention herein will be described in connection with a so-called radial fan, that is, a fan that discharges generally outwardly in a radial direction, it is also useful in assemblies having one or more axial fans arranged in side by side relation and directing air through a heat exchanger assembly or module via a common duct, typically a fan shroud.

Figure 1:
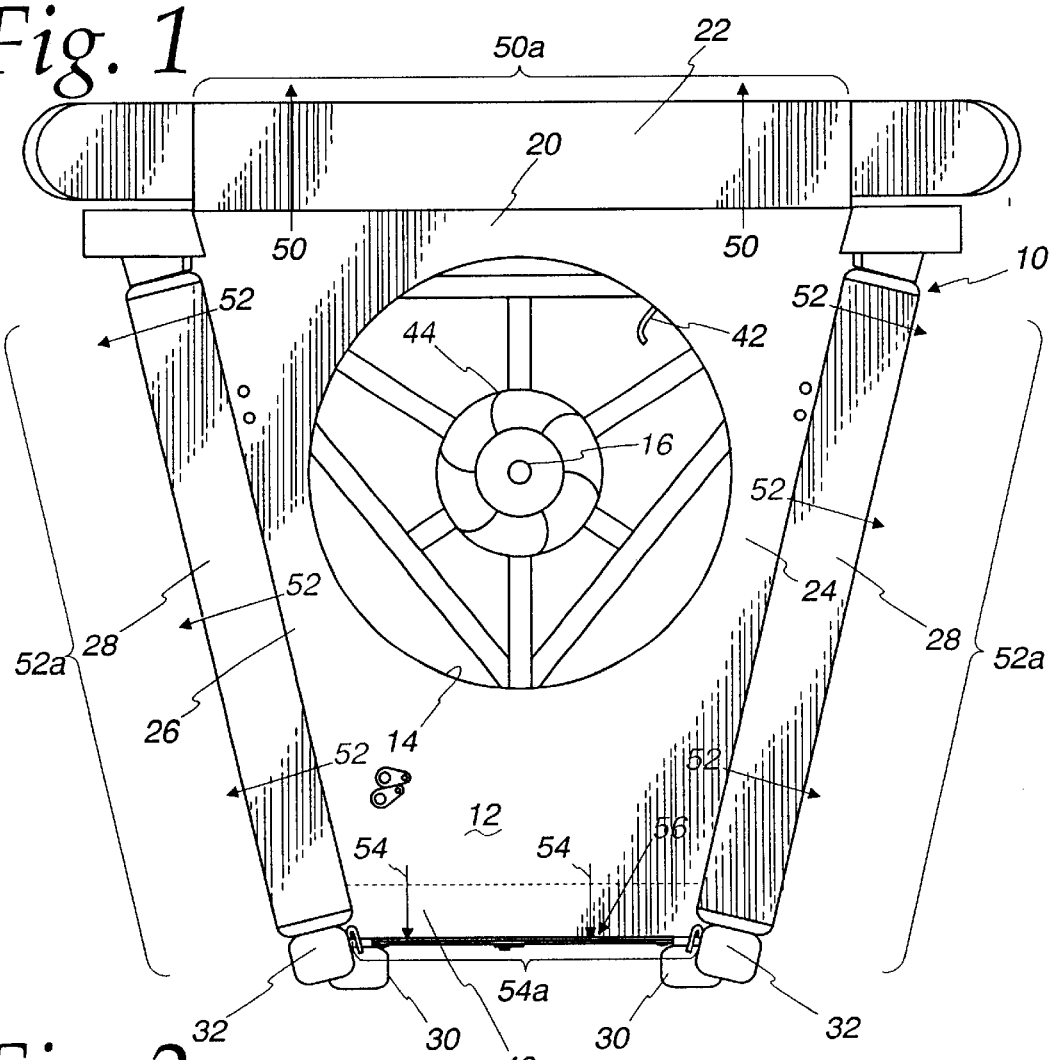
FIG. 1 is a side elevation of the mechanical components of the cooling system.
Figure 2:
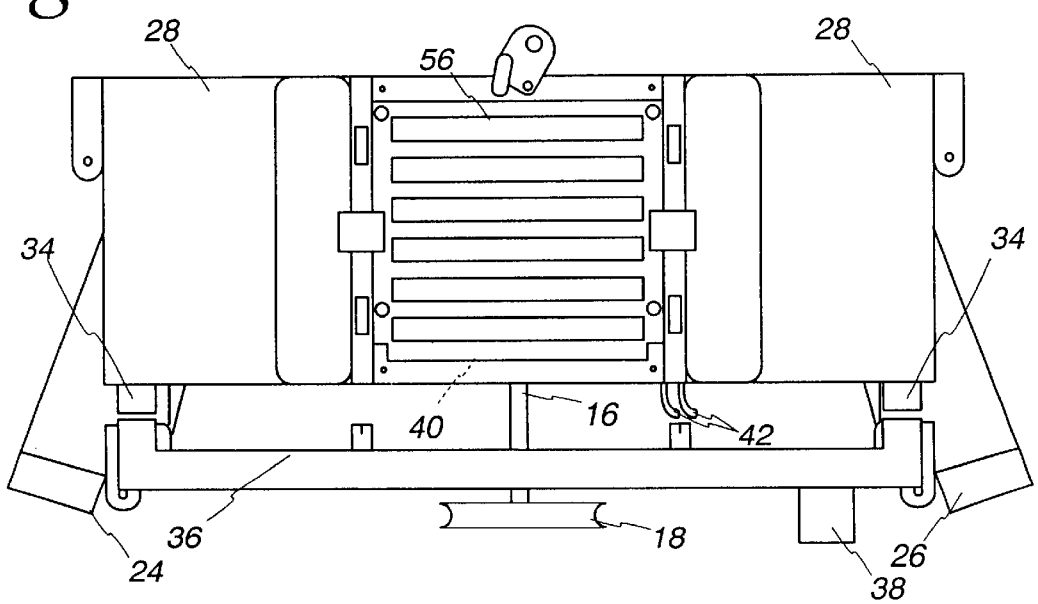
FIG. 2 is a bottom plan view of the assembly of component.

With the foregoing in mind, the invention will now be described with reference to FIGS. 1 and 2. A cooling system package, generally designated 10, is illustrated and includes a front panel 12 provided with a circular opening 14 centered on the rotational axis of a shaft 16 that is typically driven by an electric motor and/or via a selectively operating clutching system receiving rotary power on a sheave 18 (FIG. 2) connected by a fan belt or the like to an internal combustion engine that is employed for propulsion purposes in the vehicle in which the system is employed. It will be observed that the panel 12 is in the shape of a trapezoid and several heat exchangers extend rearwardly from the panel 12. At the top 20 of the panel, a so-called charge air cooler 22 is disposed. As seen in FIG. 2, the charge air cooler includes an inlet 24 and an outlet 26. The inlet 24 will conventionally be connected to the outlet of a turbocharger driven by the exhaust gases from the propulsion engine of the vehicle. The outlet 26 directs compressed combustion air ultimately to the cylinders of the engine.

Opposed sides 24 and 26 of the panel 12 are abutted by radiators 28 which may be of conventional construction. The radiators 28 include lower ports 30 from respective headers 32 which are connected to the inlet side of the coolant system for the propulsion engine. Upper ports 34 (FIG. 2) may be connected to a cross conduit 36 which in turn has an inlet port 38 connected to the discharge side of the coolant system for the propulsion engine.

At the bottom of the panel 12 a conventional condenser or gas cooler 40 is located. While not shown herein, the same will conventionally have inlet and outlet ports with the inlet port being connected to an engine driven compressor (not shown) and the outlet port connected to an expansion device such as a capillary or an expansion valve.

The inwardly facing sides of the charge air cooler 22, radiator 28 and gas cooler 40 define respective frontal areas through which air entering the inlet may pass. It is to be noted that the respective frontal areas are unique with respect to the heat exchanger with which they are associated. That is to say, the frontal areas do not overlap because the heat exchanger are not superimposed as in many conventional constructions.

Additionally, conduits 42 (FIG. 2) may be connected to an oil cooler, typically a transmission oil cooler, disposed within the housing defined by the heat exchangers 22, 28, 40 and the panel 12.

Aligned with the inlet 14 and mounted on the end of the shaft 16 is the impeller 44 of a radial discharge fan. It will be observed that the impeller is surrounded by the heat exchangers 22, 28, 40 and by reason of its radial discharge, will direct air flow outwardly through the heat exchangers 22, 28 and 40 to respectively cool charge air, engine coolant and refrigerant.

A rear panel (not shown) is located on the opposite side of the impeller 44 from the panel 12 so as to essentially prevent air entering the inlet 14 from bypassing the heat exchangers 22,28 and 40. That is to say, such a panel is intended to assure that all air entering the inlet 14 is directed via separate flow paths 50, 52, 54 through the charge air cooler 22, the radiator 28 and the gas cooler 40 to points of discharge surrounding the structure illustrated in FIG. 1. One point of discharge is generally the radially outer side of the charge air cooler 22 and is designated 50a. Discharge points for the radiators 28 are designated 52a while the discharge point for the condenser or gas cooler 40 is designated 54a.

A shutter assembly, generally designated 56, is located on the radially outer side of the gas cooler 40 so as to control the passage of air passing through the condenser 40.

Figure 3:
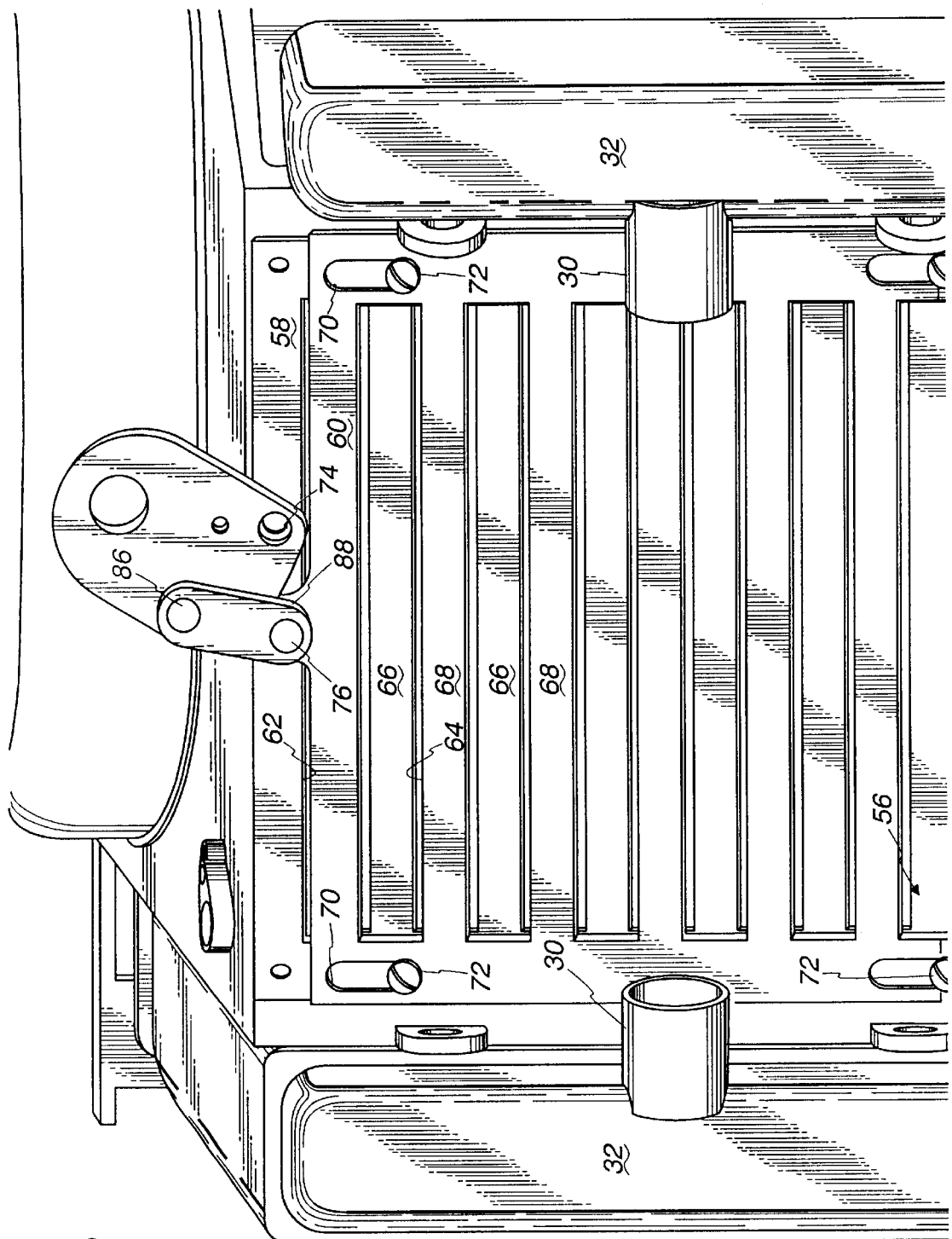
FIG. 3 is an enlarged fragmentary view of a shutter employed in the invention with its components in a closed position.
Figure 4:
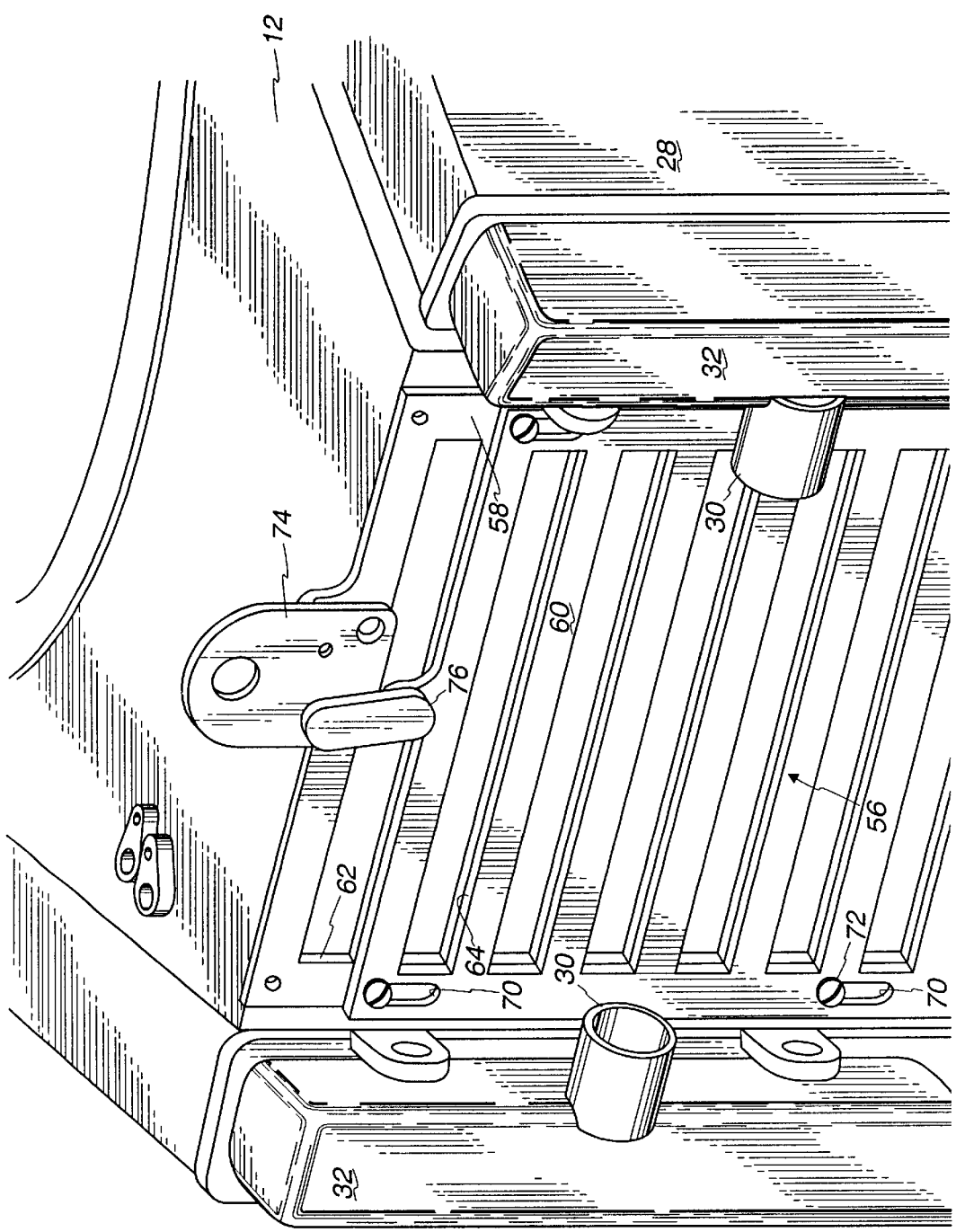
FIG. 4 is a view similar to FIG. 3 but showing the shutter components in an open position.

Turning now to FIGS. 3 and 4, the shutter system 56 is seen to be made up of two grates 58 and 60. Each grate 58 and 60 is generally rectangular and includes elongated slots 62 in the grate 58 and 64 in the grate 60. The slots 62 and 64 are separated by bars 66 and 68, respectively. FIG. 3 shows the slots 62 of the grate 58 essentially closed by the bars 68 of the grate 60 which corresponds to a substantially closed position of the shutter 56. On the other hand, FIG. 4 shows the slots 62 of the grate 58 and 64 and of the grate 60 aligned with one another corresponding to an open position of the shutter 56. To achieve this, the grate 60 is made to move or slide upon the grate 58 which in turn is affixed in overlying relation to the radially outer side of the condenser or gas cooler 40 by any suitable means. A sliding connection is established by elongated slots 70 in the sides of the grate 60 with headed pins 72 extending through the slots 70 to hold the grate 60 in superimposed relation to the grate 58 while allowing sliding movement between the two.

As a consequence of this construction, air flow through the gas cooler 40 will be severely restricted when the grates 58, 60 are in the position illustrated in FIG. 3 while air flow will be substantially unrestricted when the grates 58, 60 are in the relative positions illustrated in FIG. 4. Of course, by selecting various relative positions of the grates 58 and 60 intermediate those shown in FIGS. 3 and 4, air flow may be modulated as desired between the two extremes mentioned previously.

To provide for relative movement of the two grates 58, 60, a linkage system is provided. A first link is shown at 74 in FIGS. 3, 4 and 6 and the same is connected to a second link 76 seen only in FIGS. 3 and 4.

Figure 5:
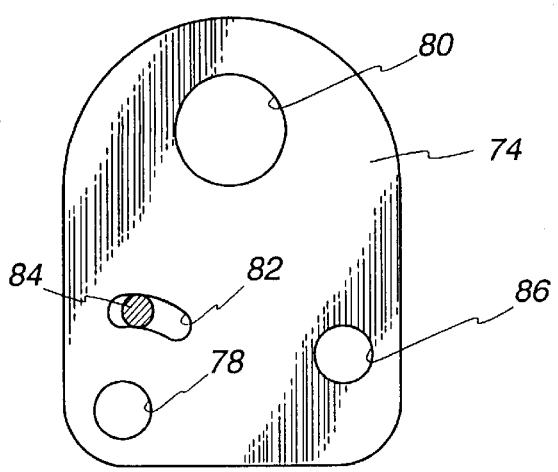
FIG. 5 is a plan view of a link employed to interconnect an actuator and the shutter.

Turning briefly to FIG. 5, the link 74 will be described in greater detail. The same includes an opening 78 which receives a pivot pin (not shown) by which the link 74 is pivoted to the fixed grate 58. Oppositely of the opening 78 is an enlarged opening 80 which can serve as a manual gripping point by which the link 74 may be moved manually, if desired. Between the openings 78 and 80 is an arcuate slot 82. The slot 82 is adapted to receive a pivot pin 84 which may be clamped at any location desired along the length of the arcuate slot 82. The position of the pin 84 within the slot 82 is adjustable so as to allow initial positioning or calibration of the position of the grate 60 with respect to the grate 58. Once the desired position of the pin 84 is achieved, it is clamped in place and calibration is achieved. The pivot pin is not pivotable within the slot 82 but is pivotally connected to the upper end 86 of the link 76 as viewed in FIGS. 3 and 4. An additional pivot pin 84 connects the lower end 88 of the link 76 to the movable grate 60.

Finally, the link 74 is provided with an opening 86 by which it may be connected to an actuator 88 (FIG. 5) as, for example, a pneumatic actuator. Thus, counterclockwise rotation of the link 74 about the pivot received in the opening 78 will tend to move grate 60 toward the position illustrated in FIG. 4 whereas clockwise movement of the link 74 will cause the same to move the link 76 upwardly to move the grate 60 into the position illustrated in FIG. 3.

From the foregoing, it will be appreciated that air flow through the inlet 14 and driven by the impeller 44 may be increased through the power train components, namely the charge air cooler 22 and the radiators 28 by closing the shutter 56 and preventing discharge of the air through the gas cooler 40. On the other hand, air flow through the power train components 22, 28 as well as the gas cooler 40 will occur when the shutter is open.

In typical operation of a vehicle, power train heat rejection will be low while gas cooler heat rejection will be high during idling or when the vehicle is cruising under partial engine load. In this situation, it is desirable that the shutter 56 be open. On the other hand, when both the power train and refrigerant heat rejection loads are high, the shutter will be closed or partially closed such as to allow only the required air flow through the gas cooler 40 thereby maximizing air flow through the power train components. This shutter operation mode reduces fan horsepower requirements by reducing the overall volume flow rate of air required to cool the power train. The energy otherwise spent on operating the fan may then be used to power the vehicle with the result that more of the power developed by the engine is available for propulsion and/or there will be reduced fuel consumption. It also reduces the size of the power train heat exchangers.

It is also desirable that when the gas cooler heat rejection is low and power train heat rejection is high, that the shutter system operate in a pre-determined partially closed or fully closed position thereby providing maximum possible power train air flow to maximize power train heat rejection.

Figure 6:
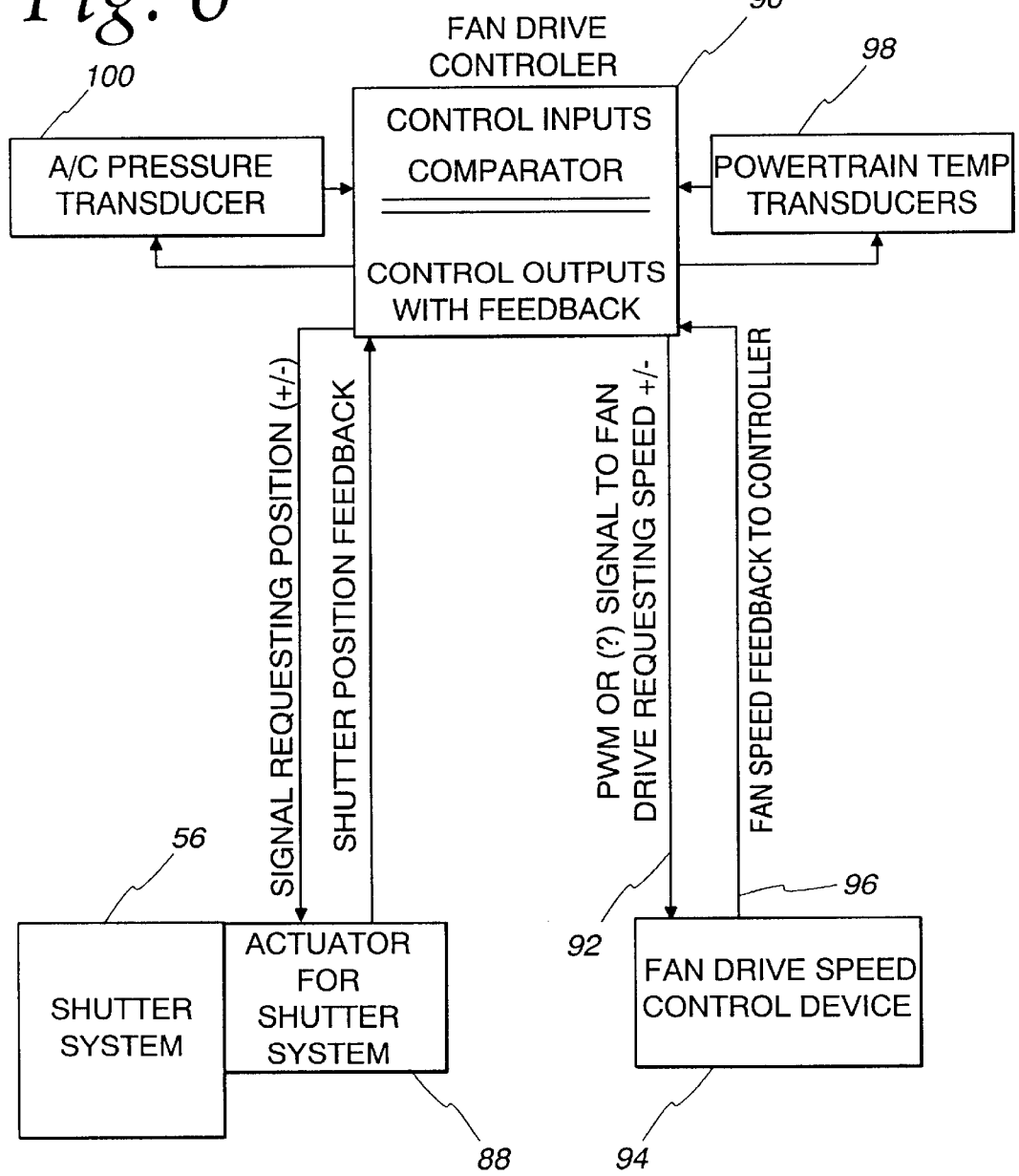
FIG. 6 is a block diagram of a control for the system.

To this end, a control system such as shown in block form in FIG. 6 is provided. Sophisticated vehicles conventionally employ fan drive controllers, shown at 90 in FIG. 6. The fan drive controller will receive all of the conventional inputs and provide the conventional outputs to which it will issue signals on a line 92 to a conventional fan drive speed control device 94 to control fan speed from zero rpm upward to maximum fan speed for the system. A position feedback speed control signal is provided on line 96.

The fan drive controller is modified to include input from power train temperature transducers 98. That is to say, temperature monitoring devices in the form of transducers are employed in the various fluid flow lines to monitor the temperature of the charge air flow through the charge air cooler 22 as well as the engine coolant flow through the radiators 28 as well as transmission oil temperature if desired. A set point for the temperatures is programmed into the fan drive controller 90 which serves to compare the monitored temperatures against the set point to provide a signal to the fan drive speed control device 94 as well as to the actuator. In addition, a pressure transducer 100 in the air conditioning system monitors pressure therein as an indication of the heat rejection load on the air conditioning system just as the transducers 98 provided an indication of the heat rejection load produced by the power train components. Logic within the controller 90 makes the comparison at box 102 of FIG. 7 by inquiring as to whether any of the power train fluid temperatures are above the "fan on" set point, that is, a temperature sufficiently high that the fan should be operating at high speed. If they are, as shown at box 104, the fan drive controller directs the shutter 88 to move to a partially closed or fully closed position so as to direct the minimum required air flow to the gas cooler 40 while maximizing air flow through the power train heat exchangers 22, 28. On the other hand, if the comparison yields the information that the power train fluid temperatures are not above the fan on set point, the fan drive controller 90 directs the actuator to move the shutters 56 to the open position thereby allowing unrestricted air flow through the gas cooler 40. This is shown at box 106.

As a result of the foregoing, the above described advantages are obtained by controlling air flow through the gas cooler 40 in response to operating conditions within both the power train part of the cooling system and the air conditioning part of the system. Again, it is observed that fan horsepower requirements are reduced as may be the size of the power train heat exchangers such as the charge air cooler 22 and the radiators 28.

And, while the system has been described with a shutter system employing relatively movable grates, a vaned shutter system using movable vanes or flaps could be employed as well. The movable grate shutter system is preferred since it occupies less space, which frequently is at a premium in vehicular applications.

We claim:
1. In a vehicular cooling system the combination of
    an inlet for receipt of ambient air;
    first and second heat exchangers in proximity to said inlet to receive ambient air therefrom and respectively adapted to receive first and second heat exchange fluids to be cooled by the ambient air;

said first and second heat exchangers being in side by side, substantially non superimposed relation to define first and second air flow paths extending in fluid flow parallel through a respective one of said heat exchangers from said inlet to one or more points of discharge;

one or more fans for flowing air from said inlet through said first and second flow paths:
- a shutter in one of said flow paths and movable between a first position relatively restricting air flow through said one flow path and a second position allowing relatively unrestricted air flow through said one flow path and additional positions intermediate said first and second positions;
- an actuator for moving said shutter between said positions; and
- a control for said actuator,
- said control including a fan drive controller for said fan(s) operative to a) control the speed of said fan(s) and b) provide a position control signal for said actuator.

2. In a vehicular cooling system the combination of an inlet for receipt of ambient air;

first and second heat exchangers in proximity to said inlet to receive ambient air therefrom and respectively adapted to receive first and second heat exchange fluids to be cooled by the ambient air;

said first and second heat exchangers being in side by side, substantially non superimposed relation to define first and second air flow paths extending in fluid flow parallel through a respective one of said heat exchangers from said inlet to one or more points of discharge;

one or more fans for flowing air from said inlet through said first and second flow paths:
- a shutter in one of said flow paths and movable between a first position relatively restricting air flow through said one flow path and a second position allowing relatively unrestricted air flow through said one flow path and additional positions intermediate said first and second positions;
- an actuator for moving said shutter between said positions; and
- a control for said actuator,
- said first heat exchanger being a radiator for cooling engine coolant and said second heat exchanger being a gas cooler for an air conditioning system and said control including a fan controller providing a "fan on" set point, a transducer for monitoring the temperature of said first fluid, and a comparator for comparing the monitored temperature with the set point and causing said actuator to a) move the shutter toward said first position when said monitored temperature exceeds said set point and b) move the shutter toward said second position when said monitored temperature does not exceed said set point.

3. In a vehicular cooling system the combination of an inlet for receipt of ambient air;

first and second heat exchangers in proximity to said inlet to receive ambient air therefrom and respectively adapted to receive first and second heat exchange fluids to be cooled by the ambient air;

said first and second heat exchangers being in side by side, substantially non superimposed relation to define first and second air flow paths extending in fluid flow parallel through a respective one of said heat exchangers from said inlet to one or more points of discharge;

one or more fans for flowing air from said inlet through said first and second flow paths:
- a shutter in one of said flow paths and movable between a first position relatively restricting air flow through said one flow path and a second position allowing relatively unrestricted air flow through said one flow path and additional positions intermediate said first and second positions;
- an actuator for moving said shutter between said positions; and
- a control for said actuator, and
- there being two said first heat exchangers and said second heat exchanger has one side adjacent one of said first heat exchangers and an opposite side adjacent the other of said first heat exchangers; and a third heat exchanger oppositely of said second heat exchanger and having a first side adjacent one of said first heat exchangers and an opposite side adjacent the other of said first heat exchangers, said fan being surrounded by said heat exchangers.

4. The vehicular cooling system of claim 3 wherein said heat exchangers are arranged as respective sides of polygonal solid having a trapezoidal cross section.

5. In a vehicular cooling system the combination of an inlet for receipt of ambient air;

first and second heat exchangers in proximity to said inlet to receive ambient air therefrom and respectively adapted to receive first and second heat exchange fluids to be cooled by the ambient air;

said first and second heat exchangers being in side by side, substantially non superimposed relation to define first and second air flow paths extending in fluid flow parallel through a respective one of said heat exchangers from said inlet to one or more points of discharge;

one or more fans for flowing air from said inlet through said first and second flow paths:
- a shutter in one of said flow paths and movable between a first position relatively restricting air flow through said one flow path and a second position allowing relatively unrestricted air flow through said one flow path and additional positions intermediate said first and second positions;
- an actuator for moving said shutter between said positions; and
- a control for said actuator,
- said shutter including a fixed element and a movable element mounted for movement relative to said fixed element, a first link connected to said fixed element by a first pivot and connected to said actuator, and a second link connected to said movable element by a second pivot and to said first link by a third pivot spaced from said first pivot.

* * * * *